Feb. 27, 1940. E. C. BODE 2,191,437
AUTOMOBILE DOOR LOCK
Filed Feb. 20, 1939

INVENTOR
Edgar C. Bode
by
HIS ATTORNEY.

Patented Feb. 27, 1940

2,191,437

UNITED STATES PATENT OFFICE 2,191,437

AUTOMOBILE DOOR LOCK

Edgar C. Bode, Courtland, Minn.

Application February 20, 1939, Serial No. 257,385

3 Claims. (Cl. 292—166)

My invention relates to new and improved automobile door locks and particularly refers to the improvement in the construction of a safety means of operation.

It is now the general practice to equip automobile doors with manually operated pivotal control handles projecting from the door the handle usually being carried on a horizontal pivotal shaft mounted transversely within the said automobile door and the operation thereof calls for a downward turning movement of the handle by the operator to actuate said releasement of latch bolt.

As has been the case, minor children in automobiles are often prone to play with these handles, unintentionally releasing said latch by downward pressure thus throwing open the door and many times when the car is in motion expelling the occupant having a grip upon the handle.

My invention resides furthermore in an automobile door latch in which a direct pressure toward the door is required to release means as will be hereinafter more fully set forth. In the drawing, Figure 1 is a perspective view of an automobile showing an automobile door embodying my form of invention.

Figure 1:
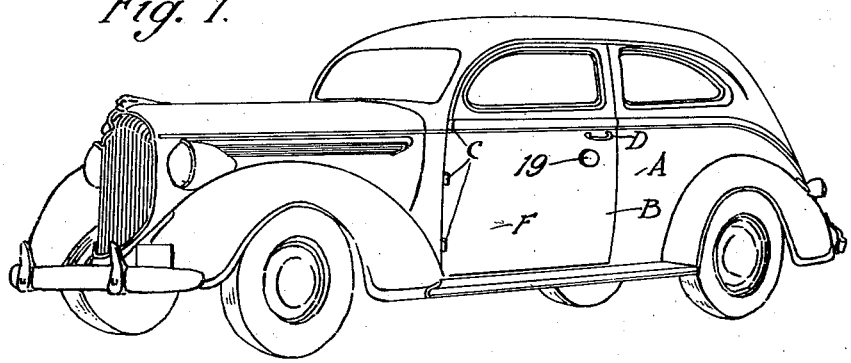

In the drawing, A represents an automobile of which B is the door pivotally suspended upon hinges C and provided with a handle grip or pull D on the exterior of the car door for the opening of said door when latch releasing pressure has been placed upon the exterior push rod knob 19.

Figure 2:
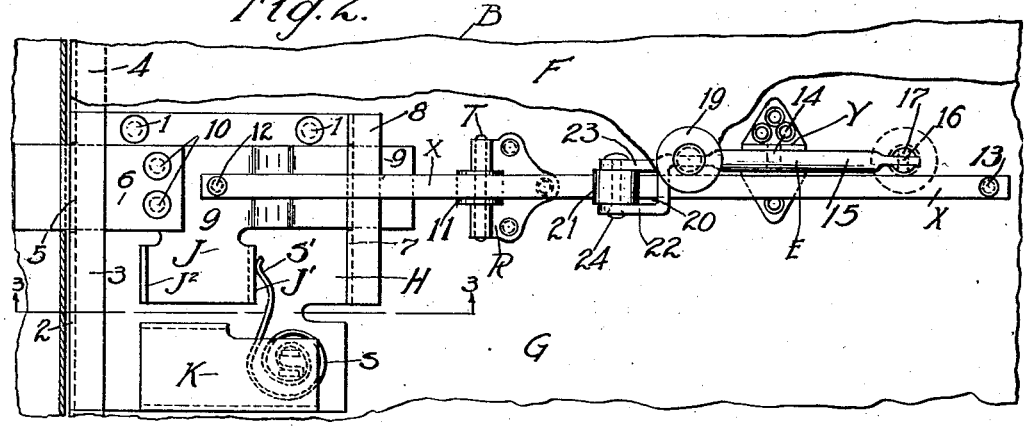
Figure 2 is a vertical plan view of locking mechanism of an automobile door with part of the outer face or side of the door removed.
Figure 3:
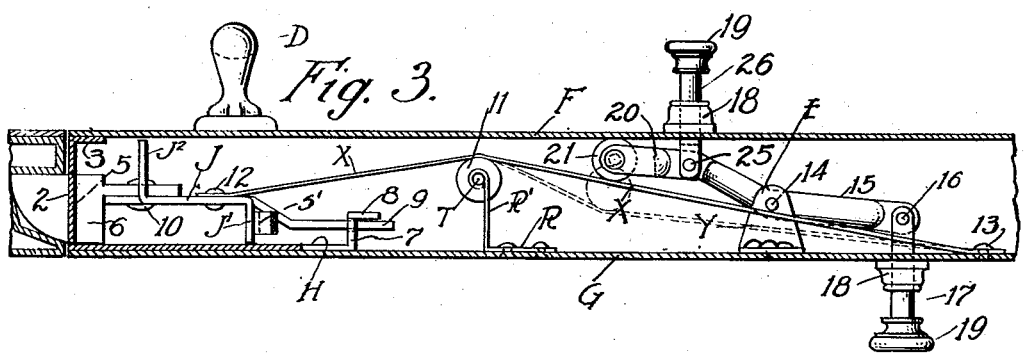
Figure 3 is a horizontal constructional section taken along the lines of 3—3 of Figure 2.

Referring to the latch mechanism, fully shown in Figure 2 and representing a portion of an automobile door B of which F is the exterior face and G the interior structural facing, the latching assembly is imposed between said door facings and made fast to the inner surface of the interior structural door facing. The latch bolt supporting mechanism H which is made fast by fastening means 1 to the structural door plate G has at its jamb end an upturned edge 2 provided with a back turned flange 3 to correspond with the construction and thickness of the door proper at its jamb edge 4.

The upturned edge 2 is provided with an opening 5 of sufficient size to permit the free in and out travel of latch bolt 6. The latch bolt supporting mechanism plate H at its interior extremity is further provided with an upturned guide edge 7 and a terminating guide lip 8 to properly align sliding latch bolt support 9. Latch bolt 6 is made rigidly fast to the sliding latch bolt support 9 by fastening means 10 thus forming a sliding latch bolt unit J which is further provided with an upturned stop finger J2 to abut unto the end of the backturned flange 3, thereby arresting any further outward travel of the latch bolt 6.

Upon the lower end of the latch bolt supporting mechanism plate H is positioned a spaced apart spring retainer K of common construction rigidly supporting spring S in permanent locked position at its inner loop end and permitting spring fingers S1 to contact an inward projected finger J1 so as to keep latch bolt 6 and its associated sliding unit J constantly positioned in its extreme projection.

Likewise upon the plate G is made fast a roller standard R with an upright roller supporting member R1 holding spring tape guiding roller 11 interspaced between the fork of the supporting member R1 upon the shaft T.

The spring steel tape is made rigidly fast at one end to the sliding latch bolt unit J at 12 and thence extending over the spring tape guiding roller 11 and down past the operating mechanism to a fastening point 13 upon plate G thus limiting the outward travel of the bolt because of the locking means provided by the length of said spring tape X.

The latch operating mechanism unit E has fulcrum support on a doubled bearing shaft 14 positioned in a doubled bearing standard Y which is made fast upon plate G. The fulcrumed shaft 14 supports a rocker arm 15 which is rockably linked through a pivot shaft 16 to a plunger rod 17 which passes through the plate G and is stayed in alignment by a plunger rod supporting guide 18. Plunger rod support guide 18 acts as a buffer and a travel limit for the push rod knob 19 which is made fast at the outer terminal of the push rod 17.

Rocker arm 15 at its latch extremity is bent away from and thence over the spring steel limit tape X and provided at its end with a fork 20 as a means of support for the tension roller 21 which is rotatably mounted upon a fixed shaft 24 held positioned in the fingers 22 and 23.

Imposed on the rocker arm 15 between the fork 20 and the rocker arm support 14 is positioned the exterior latch controlling plunger rod 26. The exterior latch controlling plunger rod 26 is connected in a linked manner to the rocker arm 15 by a rocker shaft 25. Like the plunger rod 17, the exterior latch controlling plunger rod 26 passes through the exterior door plate F and is stayed in alignment by a plunger rod guide 18 which acts as a buffer and a travel limit for said push rod knob 19 made fast at the exterior terminal of said plunger rod.

In operation, it will be seen and assuming that the said automobile door is closed, that a push upon the push knob 19 will cause the plunger rods 17 and 26 respectively to travel inwards by the fact that they are both connected in a link like manner to the actuating rocker arm 15 which is positioned in a double bearing standard Y on shaft 14. Said pressure will cause fork arm and its supporting tension roller 21 to push the said tension roller against the spring steel tape X and bend the said spring steel tape, thereby foreshortening the distance between the terminal fastenings of said tape.

Since one end of said steel spring tape is made rigidly fast to the door structure proper and the other end connected to the sliding latch bolt unit J, the said foreshortening by bending of the spring steel tape will cause the latch bolt unit J to be pulled back and thus withdrawing the latch bolt 6 which is the terminating member of the said latch bolt unit from locking position and thereby releasing said door for a swinging operation.

The door swinging motion is imparted from the exterior by a pull upon hand grip D after the releasement of the latch, while from the interior of the automobile a further push upon the push rod knob will actuate the opening of the door.

I claim:

1. In combination with a door and frame therefor, a locking means for said door comprising a door sustained spring tensioned and controlled latch bolt cooperating with locking engagement with the door frame, a latch tape made fast to the latch bolt and to said door, a roller sustaining means for the tape, a rocker arm supported by said door and operative upon said latch tape, said rocker arm being provided with slidable push arm operating means on opposite door sides for the foreshortening of the normal distance between the fastenings of the latch operating tape.

2. In combination with a door and a door frame therefor, a locking means for said door comprising a spring tensioned latch bolt supported by said door and slidable into locking engagement with the frame, a latch retracting tape connecting the latch bolt and said door, a suspended roller carrying means for the tape, a rocker arm supported by said door, a tension roller supported on the free end of said rocker arm and operative upon said tape by the moving of said rocker arm from either door side to foreshorten the normal distance between the latch tape fastenings so as to withdraw the latch from locking position.

3. In combination with a door and a supporting frame therefor, a locking means for said door comprising a slidable latch bolt supported by said door and slidable into locking engagement with said frame, a latch operating spring, a tape connected with said latch bolt and to said door, a roller carrying means for said latch tape, a rocker arm operative upon said tape by rocker arm operating plunger means from either door side.

EDGAR C. BODE.